(12) United States Patent
Davis (10) Patent No.: US 11,524,535 B2
(45) Date of Patent: Dec. 13, 2022

(54) JACK AND TOW MODULE FOR TOWING A TRAILER WITH A TRUCK

(71) Applicant: Davis Industries LLC, Dayton, IA (US)

(72) Inventor: Matt Davis, Dayton, IA (US)

(73) Assignee: DAVIS INDUSTRIES LLC, Dayton, IA (US)

( * ) Notice: Subject to any disclaimer, the term of this patent is extended or adjusted under 35 U.S.C. 154(b) by 53 days.

(21) Appl. No.: 17/081,728

(22) Filed: Oct. 27, 2020

(65) Prior Publication Data

US 2021/0122201 A1 Apr. 29, 2021

Related U.S. Application Data

(60) Provisional application No. 62/927,369, filed on Oct. 29, 2019.

(51) Int. Cl.
| | | |
|---|---|---|
| *B60D 1/40* | (2006.01) | |
| *B60D 1/14* | (2006.01) | |
| *B60D 1/26* | (2006.01) | |
| *B60D 1/167* | (2006.01) | |

(52) U.S. Cl.
CPC .............. *B60D 1/40* (2013.01); *B60D 1/143* (2013.01); *B60D 1/1675* (2013.01); *B60D 1/26* (2013.01)

(58) Field of Classification Search
CPC .......................... B62D 53/065; B62D 53/0821
See application file for complete search history.

(56) References Cited

U.S. PATENT DOCUMENTS

| | | | | |
|---|---|---|---|---|
| 3,288,315 A | * | 11/1966 | Bigden | B60P 1/025 280/901 |
| 3,406,852 A | * | 10/1968 | Winckler | B62D 53/0828 280/901 |
| 3,698,582 A | * | 10/1972 | Weinmann | B62D 53/065 280/441.2 |
| 3,866,947 A | * | 2/1975 | Yakubow | B62D 53/065 280/441.2 |
| 3,876,674 A | | 4/1975 | Jenkins | |
| 3,893,711 A | | 7/1975 | Goodwin | |
| 4,390,192 A | * | 6/1983 | Wagner | B62D 53/065 280/441.2 |
| 5,297,653 A | | 3/1994 | Wurtz et al. | |

(Continued)

FOREIGN PATENT DOCUMENTS

EP 995669 A1 * 4/2000 ........... B62D 53/065

*Primary Examiner* — Kevin Hurley
(74) *Attorney, Agent, or Firm* — Westman, Champlin & Koehler, P.A.; Z. Peter Sawicki; Amanda M. Prose (57) ABSTRACT

A lift and tow module for use with a trailer and method of towing a trailer with a truck. The module has an arm having a connection point for securing to a tow vehicle and a lift body having a connection point for securing the lift body to a trailer. The connection point comprises at least two connection mechanisms spaced apart on the main body for connection to corresponding mechanisms on the trailer. A support plate is extendable from and operably supported by the main body and the lift body is movable in reciprocal directions. Mechanical actuators are operably coupled to the body and the arm for controlling respective movement, which allows the module to jack up a trailer, connect to a trailer, and/or tow a trailer.

6 Claims, 7 Drawing Sheets

(56) References Cited

U.S. PATENT DOCUMENTS

| | | | |
|---|---|---|---|
| 5,967,733 A * | 10/1999 | Cash | B60P 1/28 |
| | | | 414/494 |
| 6,158,761 A | 12/2000 | King | |
| 6,176,674 B1 | 1/2001 | Meeks et al. | |
| 6,283,538 B1 | 9/2001 | Reitnouer | |
| 6,378,887 B2 * | 4/2002 | Landoll | B62D 53/065 |
| | | | 280/425.2 |
| 6,767,172 B2 * | 7/2004 | French | B60P 1/43 |
| | | | 414/481 |
| 6,932,372 B2 * | 8/2005 | French | B62D 53/065 |
| | | | 280/425.2 |
| 8,322,968 B1 | 12/2012 | Mizner | |
| 8,459,685 B2 * | 6/2013 | Wood | B62D 53/065 |
| | | | 280/441.2 |
| 9,346,498 B2 * | 5/2016 | Throop | B62D 53/062 |
| 10,219,438 B1 * | 3/2019 | Studebaker, Jr. | B65G 67/02 |
| 2007/0166138 A1 | 7/2007 | Brooks | |

\* cited by examiner

JACK AND TOW MODULE FOR TOWING A TRAILER WITH A TRUCK

CROSS-REFERENCE TO RELATED APPLICATION

The present application is based on and claims the benefit of U.S. provisional patent application Ser. No. 62/927,369, filed Oct. 29, 2019, the content of which is hereby incorporated by reference in its entirety

BACKGROUND

The present invention relates to a jack and tow assembly for a trailer and more specifically to an assembly for connecting a trailer to a truck for towing and without the need for a jack and which allows the truck to tow a load of increased weight.

SUMMARY

An aspect of the present disclosure relates to a lift and tow apparatus having an arm terminating at a first end in a connection point configured for securing the apparatus to a tow vehicle and extending upwardly from the connection point and a lift body terminating at a first end in a connection point configured for securing the apparatus to a trailer. The lift body connection point comprises at least two connection mechanisms spaced apart on the terminal first end for connection to corresponding mechanisms on the trailer. The apparatus has a main body extending between a connection with a second end of the arm and a second end of the lift body. Further, an adjustable arm terminating in a support plate and operably supported by the main body is extendable therefrom. The lift body is movable in reciprocal directions by way of at least one mechanical actuator operably coupled to the vertical body and the adjustable arm is extendable and retractable by way of at least one mechanical actuator operably coupled to the adjustable arm.

The tow vehicle is a truck, such as a pickup truck. The trailer is a front-end loading trailer.

The lift body connection point comprises three connection mechanisms and wherein two of the three connection mechanisms are of the same construction. The at least two connection mechanisms are positioned on opposing side arm ends of the lift body and further comprising a third connection mechanisms positioned substantially in a center position between the at least two connection mechanisms.

The lift body comprises opposing side arm ends extending from the lift body for connection with a trailer and wherein operational components for the mechanical actuators are receiving with a portion of the lift body extending between the opposing side arm ends.

The opposing side arm ends terminate in a cylinder or tube held by a hooked end of the side arm for coupling to a corresponding connection point on the trailer. The lift body further comprises a hooked portion extending downwardly from the body for sliding into a slot of the trailer and receiving a locking mechanism therethrough for securing the lift body to the trailer.

The mechanical actuators may be remotely controlled by a remote control in wired or wireless connection with the operational components of the apparatus. For example, in wired connection, a remote control can be plugged into a socket on the lift arm in connection with operational components supported within a housing of the lift arm.

The tow vehicle connection arm terminates in a coupling for securing the tow vehicle connection arm in an upright position to a gooseneck hitch positioned in a bed of the tow vehicle.

Another aspect of the present disclosure relates to a trailer for towing with the lift and tow apparatus, where the trailer has a frame having a first end and a second end with a deck supporting body extending therebetween and wherein the first end is a loading end and the second end supports one or more axles for providing one or more pairs of wheels to the trailer. The first end comprises two hooked connection points spaced apart from one another and a receiving slot positioned in a space between the two hooked connection points wherein the receiving slot has opposing side walls each having an aperture therein and a locking mechanism comprising a pin wherein the apertures and receiving slot are configured to receive the pin therethrough for securing the lift and tow apparatus to the trailer.

The frame has a plurality of tapered support beams spaced apart along a length of the body of the trailer for supporting the deck thereon. The tapered support beams are positioned such that the beams have a length positioned transverse to a length of the body of the trailer extending between the first and second ends of the trailer and wherein the support beams comprise a tapered height along the length of the support beam.

A face of one or more of the plurality of support beams comprises one or more tabs protruding outwardly therefrom and wherein the tabs may also have an aperture in a tab surface for wiring trailer lights or other electronic equipment by holding wires along the length of the trailer.

Yet another aspect of the present disclosure relates to a method of lifting and towing a trailer with a tow vehicle by providing a lift and tow apparatus configured with a first attachment end for connection to a tow vehicle and a second attachment end for connection to a trailer and securing the first attachment end to a corresponding attachment mechanism on a bed of the tow vehicle. Lowering the second attachment end to couple one or more connection points on a terminal end of the second attachment end to one or more corresponding connection points on the trailer and raising the second attachment end to lift a connected end of the trailer off a ground surface to a road height for towing allows the trailer to be connected in one or more positions with respect to the ground surface. The trailer can be secured to the apparatus and thus tow vehicle by engaging one or more locking mechanisms to secure the second attachment at a selected height and to secure the second attachment to the trailer for towing.

Additional positions for use of the lift and tow apparatus include lowering the second attachment and uncoupling the second attachment end from the trailer and lowering a support arm on the lift and tow apparatus onto the bed of the tow vehicle to support the lift and tow apparatus off of the ground surface. Additional positions for use further include lowering the second attachment end and unsecuring the first attachment end from the corresponding attachment mechanism on the bed of the trailer and removing the tow vehicle.

The lift and tow apparatus described herein includes an arm, lift body and main body comprised of steel.

DETAILED DESCRIPTION

A jack and tow module comprises a multipurpose apparatus that can be used to connect a towing vehicle to a trailer. The jack and tow module also raises and lowers the connected trailer with respect to a ground surface, thus eliminating the need for a jack when connecting or disconnecting the trailer. The jack and tow module can be securely connected to a trailer such as a front-loading trailer, for lifting and/or towing the trailer with or without a load secured on the trailer. The jack and tow module may also be secured to a tow vehicle. The jack and tow module is also configured for easy coupling and uncoupling to the tow vehicle. The tow vehicle may be a truck and the trailer may be a lowboy style trailer. The jack and tow module allows a vehicle such as a pickup truck to easily and safely tow a trailer supporting a load as heavy as 24,000 lbs or more.

The jack and tow module comprises a first attachment mechanism configured for attaching the module to the tow vehicle, a second attachment mechanism configured for attaching the module to a trailer and a main body therebetween.

The jack and tow module can be secured to the tow vehicle via various means. For example, the first attachment mechanism may comprise a tow vehicle connection arm having a terminal end configured with a dome coupling for securing the module to a gooseneck hitch of the tow vehicle, where the gooseneck hitch may be positioned in the bed of the truck. The terminal end of the tow vehicle connection arm is positional such that the hitch of the tow vehicle can be moved under the terminal end tow vehicle connection arm or removed from the terminal end of tow vehicle connection arm without requiring additional equipment for coupling and/or uncoupling the attachment.

The second attachment mechanism is a lift body that comprises at least one connection point configured to engage with a corresponding connection point on a trailer. The lift body may comprise two, three, or more connection points each for engaging with a corresponding connection point on a trailer. When there are two, three, or more connection points, the connection points may have the same or different mechanisms or combinations thereof for engaging with corresponding connection points on the trailer.

The main body extends from a connection with the tow vehicle connection or coupling arm to connection with the lift body. For example, the lift body and the tow vehicle connection or coupling arm are positioned in a generally vertical manner with the main body extending generally horizontally therebetween such that the main body is secured at upper portions of each of the lift body and tow vehicle connection or coupling arm.

The main body may also support an extensible and retractable support plate. When the support plate is lowered or extended, the support plate may contact the bed of the truck and rest thereon for supporting the module in one or more positions. For example, the support plate can be lowered for supporting the jack and tow module above a ground surface such as when the jack and tow module is not connected to a trailer. The support plate can be installed on a terminal end of a support arm. The support arm may be an adjustable arm for selecting the length of the arm supporting the support plate and allowing for use with various truck styles and bed lengths. The support plate may then be retractable into or near the steel body. The adjustable arm can be moveably connected to the steel body via one or more mechanisms allowing for lowering or extending the support arm.

One or more mechanisms or mechanical actuators for moving the lift body may be provided and supported at least in part by the main body. For example, one or more hydraulic cylinders may operably connect the main body to the lift body and be controlled to dictate movement of the lift body. The lift body or the main body may support the operating components for moving the lift body including but not limited to a battery, hydraulic pump, and corresponding electrical connections.

The lift body is vertically displaceable in reciprocating directions for connecting a terminal end of the lift body to the trailer, lifting the trailer to a road height for towing, and/or for disconnecting the terminal end of the body from the trailer and resting the trailer on the ground surface on ramp portions of the trailer. The lift body terminates in a trailer connection point, which is configured to mate with a lift body connection point of the trailer.

The lift and tow connector module is selectively separable from the trailer and/or the tow vehicle. The lift and tow connector apparatus can be controlled remotely via a wired or wireless remote control or via control components accessible on the lift and tow connector module or in a cab of the tow vehicle for example. Operations including raising and/or lowering the lift arms and/or extending or retracting the support arm are powered operations that can be carried out via remote control or otherwise on-demand.

The trailer comprises the lift body connection on a front end of the trailer. The lift body connection is a component that may be provided to any type of trailer configured for towing behind a vehicle including a lowboy, gooseneck or stack-deck type trailer. The lift body connection may be an integral portion of the frame of the trailer or an aftermarket modification for a pre-existing trailer.

The lift body connection for the trailer comprises at least one connection point configured to receive and/or engage with a complimentary element of the lift body. The lift body connection may comprise a plurality of connection points of the same or different construction and each configured to receive and/or engage with a complimentary element of the lift body. A locking mechanism is also provided to ensure secure attachment of the lift body to the trailer for towing.

As described above, examples of the trailer style may include but are not limited to a lowboy, gooseneck or stack-deck trailer or a combination thereof. The trailer includes a frame that extends from a front-loading end to a wheeled, rear end. A deck extends therebetween. The frame comprises one or more steel elements including but not limited steel tubes or rods and additional support elements. The deck may comprise metal or wood sections for supporting a load thereon. The rear-end of the trailer frame, which supports one or more axles for one or more pairs of wheels wherein a rear end of the deck sits on top of the axles and thus is above the wheels. A step deck may be provided and a length of deck then extending from a position lower than the rear end of the deck to the lift arm connection portion of the frame is referred to as the primary deck. The front end also terminates in one or more ramps to allow for front loading of the trailer.

The trailer frame further comprises one or more spaced apart load supports below at least a portion of the primary deck. These load supports may be spaced apart along the length of the primary deck between the front and rear ends of the trailer. One or more supports may be provided across the width of the trailer deck.

The load supports can be angled or tapered supports having a height that is greater at a first location than a height at a second location. The height of one or more supports may increase along a length of the support while the width of the support may be constant or may change along the length of the support. The supports may then be positioned along a length of the primary deck portion of the frame for supporting the deck thereon wherein the supports are spaced apart and positioned transverse to the length of the deck such that the length of the supports extends from a side edge of the frame towards a center of the deck.

The lift and tow module can be secured to the trailer and the lift body raised or lowered when connected to the trailer in order to lift and/or lower the trailer with respect to the ground surface. The lift body can be lowered for connecting to the trailer and raised for towing. The lift body is connectable to the trailer without the use of a jack. Moreover, the lift and tow module can be used as a jack for the trailer, whether or not the tow vehicle is connected to the lift and tow module.

The lift and tow module can be secured to the tow vehicle and connected to the trailer for towing the trailer with the tow vehicle. The module can be connected to the tow vehicle and disconnected from the trailer and the lift arms raised and locked in position for moving of the lift and tow module by the tow vehicle without a trailer or load pulled thereby. The lift and tow module can be disconnected from the tow vehicle while the lift and tow module is connected or disconnected from the trailer. The tow vehicle connection is uncoupled and the weight and position of the lift arms support the steel body such that the terminal end of the tow connection arm rises above the hitch of the tow vehicle and the tow vehicle can drive off or otherwise move the bed of the tow vehicle away from the lift and tow module.

The lift and tow module may be provided with one or more safety mechanisms which ensure the secure and locked position of the lift body with respect to the main body as well as secure coupling of the lift body to the trailer. For example, the lift device may be equipped with a locking device which selectively engages with the main body to secure a selected position of the lift body depending on the weight of the load to be hauled or the use of the lift body. In addition, the trailer may be provided with a locking mechanism to secure one or more connection points between the lift body in connection with the trailer in a locked position. The locking connection on the trailer may be controlled by a switch or actuator positioned on the trailer or the lift body. For example, a toggle switch may be provided to control the mechanical actuator for the locking mechanism.

One embodiment of the lift and tow module is illustrated at 10 in FIGS. 1-11. Referring generally to the figures, one embodiment of the module 10 is removably connectable to a tow vehicle 20 and a trailer 30 to allow for the towing of the trailer 30 by the tow vehicle 20. The module 10 comprises a tow vehicle connection 110 and a lift body 140 with a main body 120 extending therebetween. A support plate 130 may be attached to the module 10 at, for example, a location on or within the main body 120.

Overall, the module 10 may be constructed from one or more metals, alloys or like materials including but not limited to steel. Components in the module that are fixedly secured or attached may be attached by means such as welding or may otherwise be integrally formed. One or more of the lift body 140, main body 120, and/or support plate 130 may be monolithic structures.

In further detail, as illustrated in FIGS. 1-10 and 12 the tow vehicle connection 110 may comprise a tow vehicle connection arm 112 having a terminal end 114 configured for coupling to a gooseneck hitch, such as a gooseneck hitch positioned in or on a bed of a tow vehicle 20. In the illustrated embodiment, the module 10 is configured with a terminal end 114 for coupling to a gooseneck hitch ball for mounting in a bed of the tow vehicle 20. A ball coupler allows for rotation and pivoting of the tow vehicle connection arm 112 about the ball mounting in the bed of the tow vehicle 20. For example, a ball coupler may be provided in the terminal end 114. The tow vehicle connection arm 112 comprises a coupling tube for coupling with a gooseneck hitch of the tow vehicle 20 where the gooseneck hitch has a ball which projects upwardly from a bed of the tow vehicle.

The tow vehicle connection arm 112 extends upwardly or outwardly from the terminal end 114 to a connection with the main body 120. This connection is a fixed connection however it is within the scope of this disclosure that the tow vehicle connection arm 112 and main body 120 are a monolithic structure. The main body 120 then extends outwardly and away from the tow vehicle connection arm 112 and in a position generally above the terminal end 114 and/or above the tow vehicle connection arm 112.

The main body 120 comprises a frame including at least one structure extending from connection with the arm portion 112 to connection with the lift body 140. In the embodiment illustrated two main body structures 122 and 124 extend from a connection with the tow vehicle connection arm 112 to connection with the lift body 140. The main body structures 122 and 124 may be connected to any position on the tow vehicle connection arm 112 and may be connected to the same or different side faces of the arm portion 112 and at the same or different locations on the arm portion 112.

In the embodiment illustrated the main body structures 122 and 124 extend from connection with the tow vehicle connection arm 112 to spaced apart connection locations on the lift body 140. It is within the scope of this disclosure that one main body structure may extend from connection with the arm portion 112 to one or a same location on the lift body 140. As the main body structures 122 and 124 of the embodiment illustrated have a space therebetween that increases along a length of the main body 120 extending away from the vehicle connection arm 112, one or more cross supports 124 may be incorporated into the main body 120.

Support plate 130 is a moveable support for selective use. The support plate 130 is operably connected to an adjustable support arm 132. The adjustable support arm 132 is then operably connected to the main body 120, for example, to the cross support 124. Thus, the support plate 130 is a substantially flat plate that is extendable from a support arm 132 connection with the cross support 124 and can be lowered into contact with the bed of the tow vehicle 20 for supporting the module 10 when the module 10 is, for example, connected to the tow vehicle 20 but not connected to the trailer 30.

The support plate 130 is also retractable up to the main body 120 and can be retracted flush with or otherwise abutting the main body 120 and/or main body structures 122 and 124. The support arm 132 has an adjustable length for accommodating various tow vehicle types. For example, the support arm may be a telescoping arm having one or more extended lengths that can be selected and secured with a locking pin. Other means for providing an adjustable length such as sliding connections or various arm length extensions are also within the scope of this disclosure. The support arm 132 is also operably connected to the main body via a mechanical actuator 134 such as a hydraulic cylinder coupled to the support arm 132 and the main body 120 such as at the cross support 124 such that extension and retraction of the piston rod controls extension and retraction of the support arm 132 and support plate 130. Alternative embodiments of the support plate 130 include a support plate 130 retractable and extensible along the adjustable length for adjusting the length of the support plate 130 during extension for example.

The main body structures 122 and 124 are connected to the lift body 140 at one or more locations such as spaced apart locations 126. One or more mechanical actuators 128 are coupled to one or more of the main body structures 122 and 124 for raising and lowering the lift body 140 with respect, for example, to a ground surface. In the embodiment illustrated, two hydraulic cylinders 128 are provided with one operably connected to each main body structure 122 or 124 and the lift body 140.

A locking mechanism can also be provided to secure, or limit, the vertical or pivotal displacement of the lift body 140 such as when the lift body 140 is coupled to a trailer for towing. Referring back to FIGS. 8A-8B, the locking mechanism may comprise a locking plate positioned on each side of the lift body 140 and operably connected by a lever for selecting a locking position of the lift body 140. The locking plates engage with one of a selected peg on the main body where each peg corresponds to a different position of the lift body which may be selected based on load considerations for towing.

The lift body 140 is a structure that extends downwardly from the main body 120. Referring next to FIGS. 3-7, the lift body 140 has one or more connection points for securing the lift body 140 and thus the module 10 to a trailer 30. By way of non-limiting example, the illustrated embodiment comprises three connection points for securely attaching lift body 140 to the trailer 30. The lift body has two side lift arms 142 where the side lift arms may be of similar construction and positioned on opposing sides of the lift body 140. Each side lift arm 142 comprises a connection mechanism 144 which is configured to secure or couple to a corresponding mechanism 244 on the trailer 30. The lift body 140 may also comprise a central connection point where the central connection point comprises a connection mechanism 160 for securing the lift body 140 to the trailer and wherein connection mechanism 160 is configured with a safety device such as a connection locking element.

Figure 1:
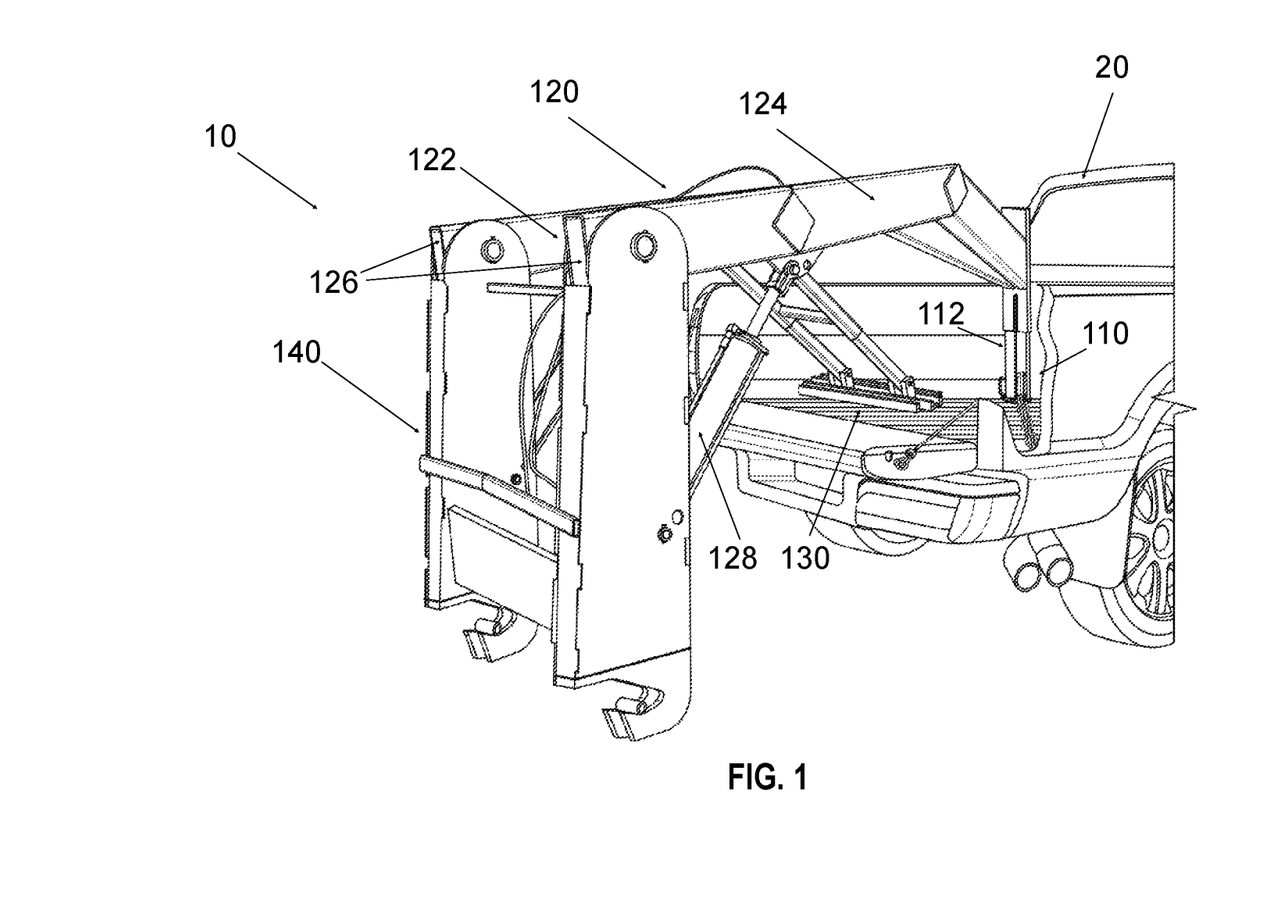
FIG. 1 is a side perspective view of the jack and tow module of the present disclosure connected to a tow vehicle.
Figure 2:
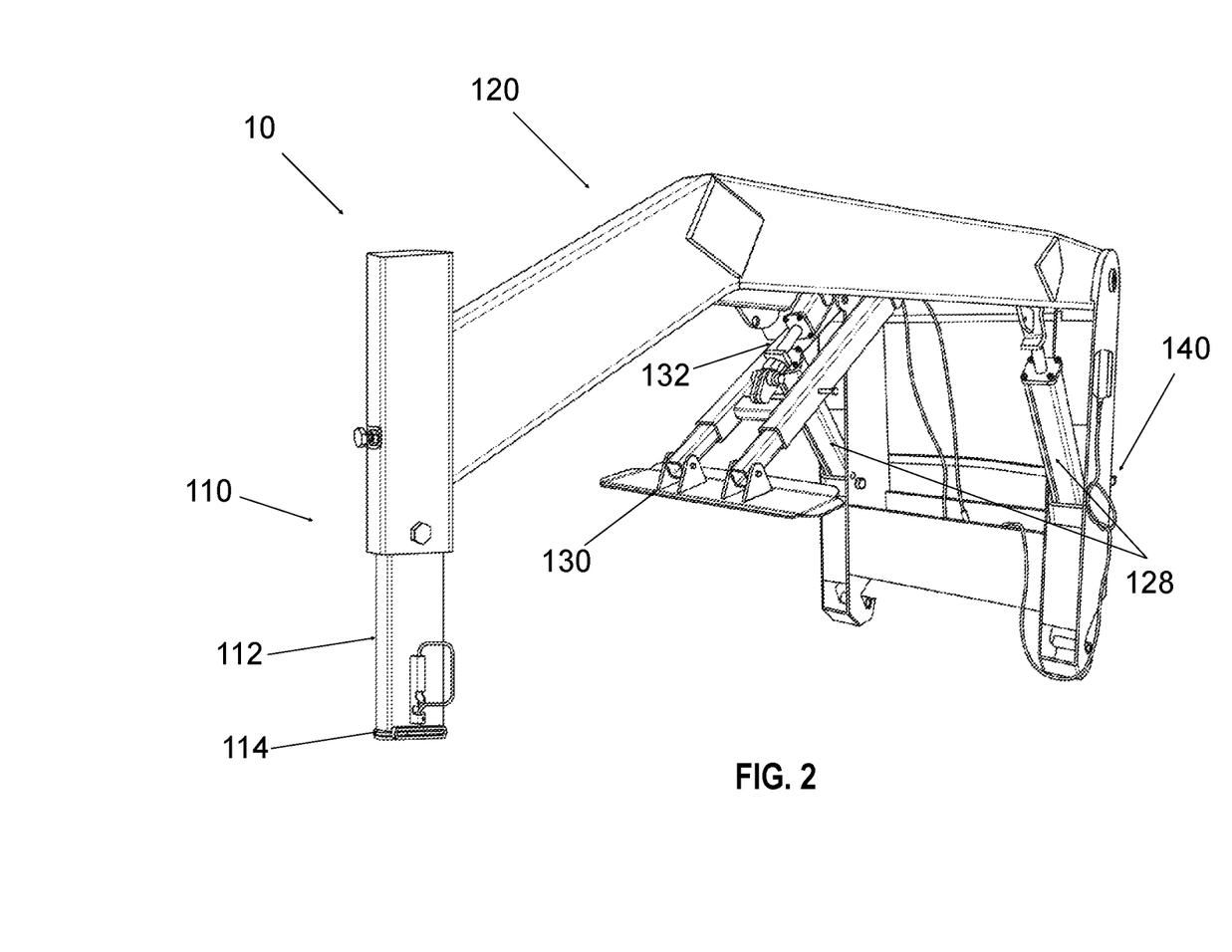
FIG. 2 is a front perspective view of the jack and tow module.
Figure 3:
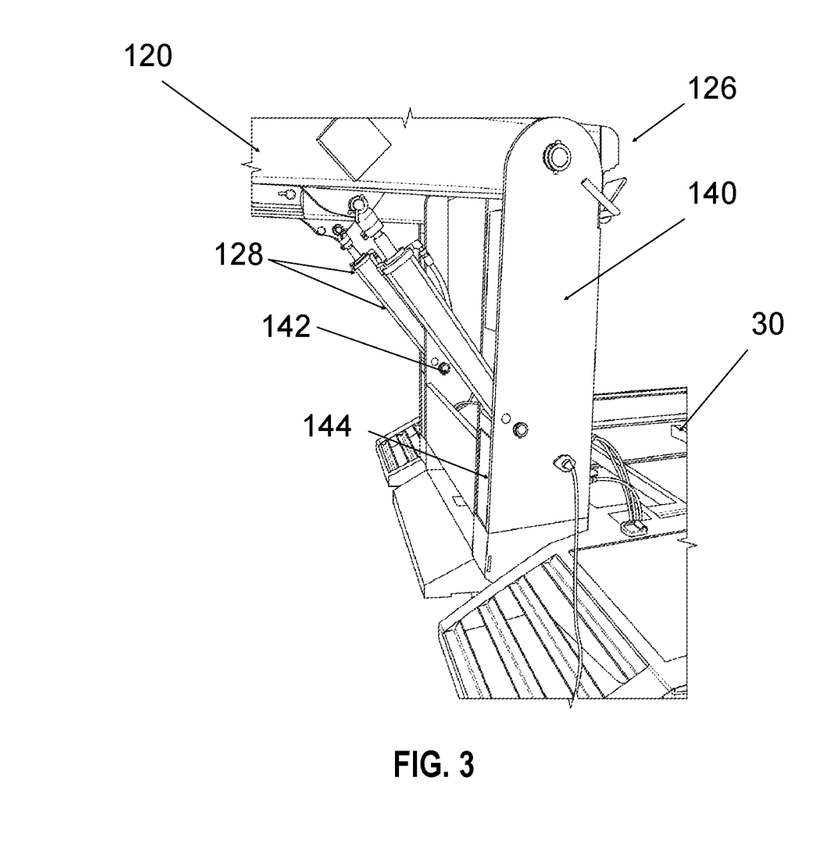
FIG. 3 is a side view of a lift and trailer connection portion of the jack and tow module and connected to a trailer.
Figure 4:
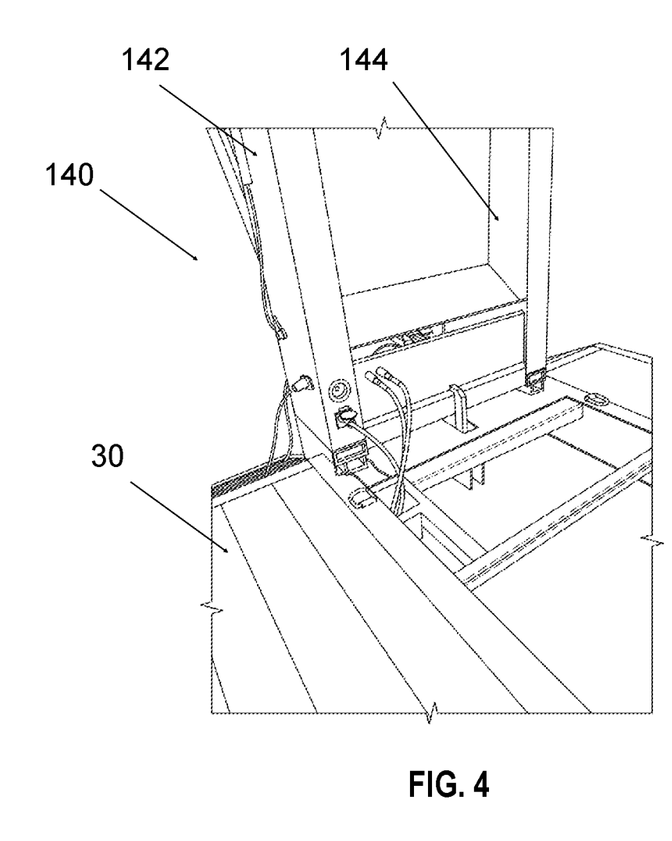
FIG. 4 is a rear view of the connection of the jack and tow module and trailer.
Figure 5:
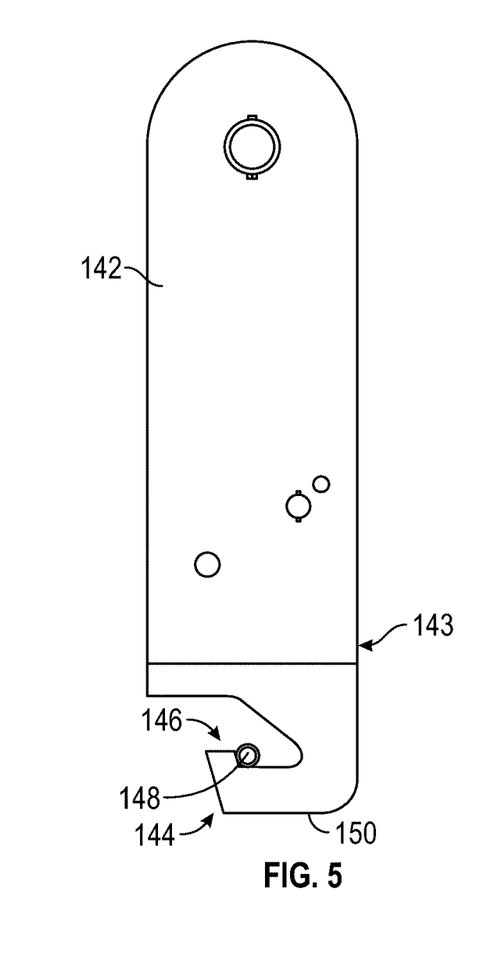
FIG. 5 is a side view of a lift connection portion of the module.
Figure 6:
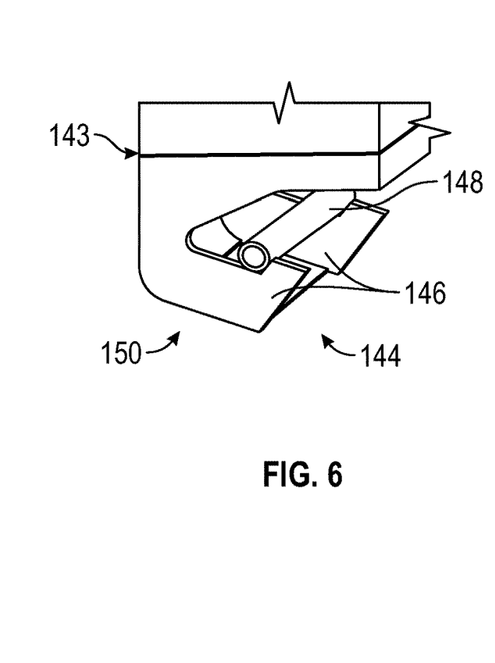
FIG. 6 is a perspective view of a first connection point of the lift connection portion of the module.
Figure 7:
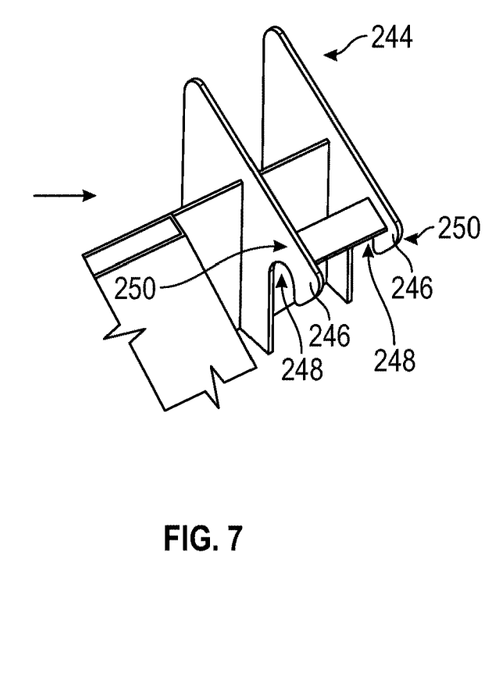
FIG. 7 is a perspective view of a first connection point of the trailer.

Referring to FIGS. 5-7, the lift arms 142 terminate in connection ends 150. The connection ends 150 comprise a hooked portion 146 with an attachment 148 wherein the hooked portion 146 catches a reciprocal hooked portion 246 on the trailer 30 and wherein attachment 148 is received for connection in an opening 248 of the hooked portion 246 of the trailer 30 to ensure contact for engagement of the connection mechanisms 144 and 244. Connection ends 150 may comprise two parallel and spaced apart hooked portions 146 forming side walls for holding opposing ends of the attachment 148, which is for example, a cylindrical tube supported on each of the side walls of the hooked portion 146.

Figures 8, 9, 10:
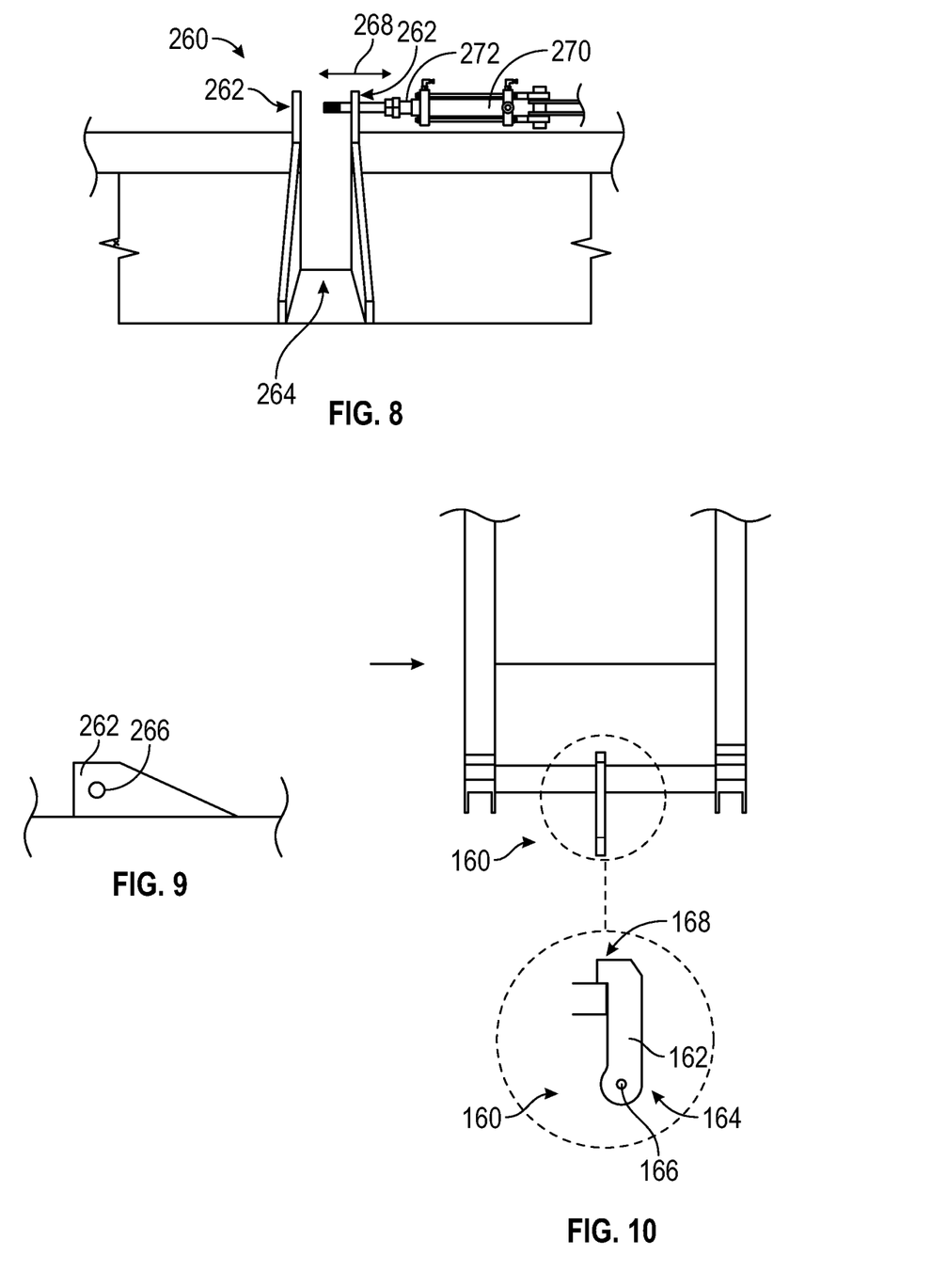
FIG. 8 is a front view of a second connection point on the trailer.
FIG. 9 is a side view of the second connection point on the trailer.
FIG. 10 is a front view of a second connection point of the lift connection portion of the module.

The locking connection mechanism 160 extends outwardly the lift body 140 at a location between the lift arms 142. As illustrated in FIG. 10, the connection mechanism 160 is an elongated plate 162 extending below the lift body 140 and having an aperture 166 in a lower end 164 thereof. The aperture 166 is configured to align with apertures 266 in raised sidewalls 262 of the corresponding connection mechanism 260 on the trailer 30 when the plate 162 is received in a connection slot 262 of the trailer. A mechanical actuator 270 is provided on the trailer 30 for automatically moving a locking mechanism 272 such as locking pin 273 along the directions of arrows 268 through each of the apertures 166 and 266 to further secure (and unsecure) the lift body 140 in connection with the trailer 30.

A connection end 220 may be provided to a trailer frame where the connection end 220 is configured to enable connection of the module 10 described herein to a trailer 30 for towing. In the embodiment illustrated, the trailer 30 comprises a front loading lowboy type trailer where ramps provided for loading the trailer allow the trailer to rest about 12 inches off the ground for loading. The connection end 220 of the trailer 30 is provided in a space between the ramps of the trailer 30 such that the module 10 fits within a space between the ramps of the trailer 30. The connection mechanisms 244 are positioned on sides inside the space between the ramps and central connection mechanism 260 is positioned therebetween. The connection points are thus non-obstructive when a vehicle or tractor is driven up the ramps for loading the trailer 30.

The trailer 30 of the illustrated embodiment has a frame 302 that may integrally comprise connection end 220 as a front end. However, the frame 302 extending away from the connection end 220 and supporting a trailer deck 300 thereon may be provided in other trailer configurations, types and styles. The frame 302 has a plurality of spaced apart side supports 304 which provide load support to the deck 300. The side supports 304 are spaced apart along a length of the trailer deck and as illustrated in the figures are positioned across the width of the trailer deck. Each side support 304 is a tapered support plate having a first end 306 with a first height that is less than a second height of the second end 308 of the support plate 304. The support plate 304 is also positioned on the frame to extend from a side of the frame 302 towards a center portion of the frame, as identified by arrow 310.

Figure 11:
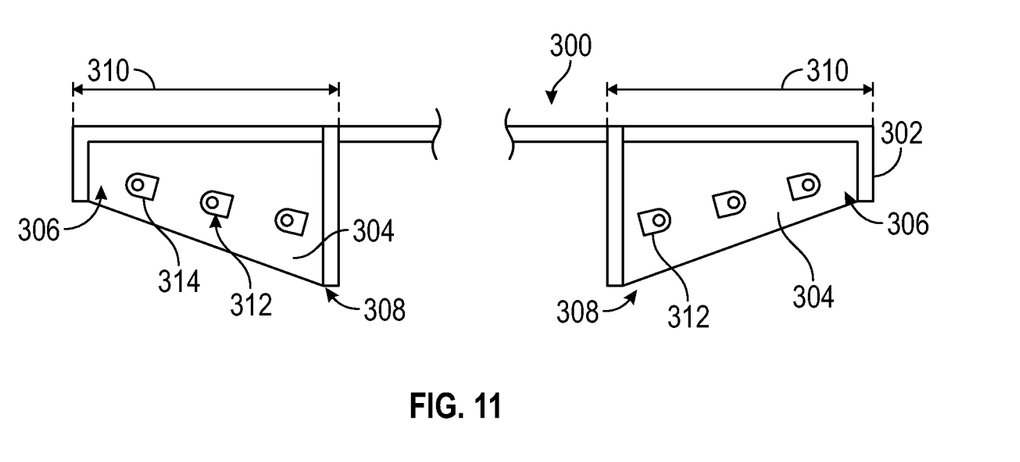
FIG. 11 is a front view of a trailer connection end.
Figure 12:
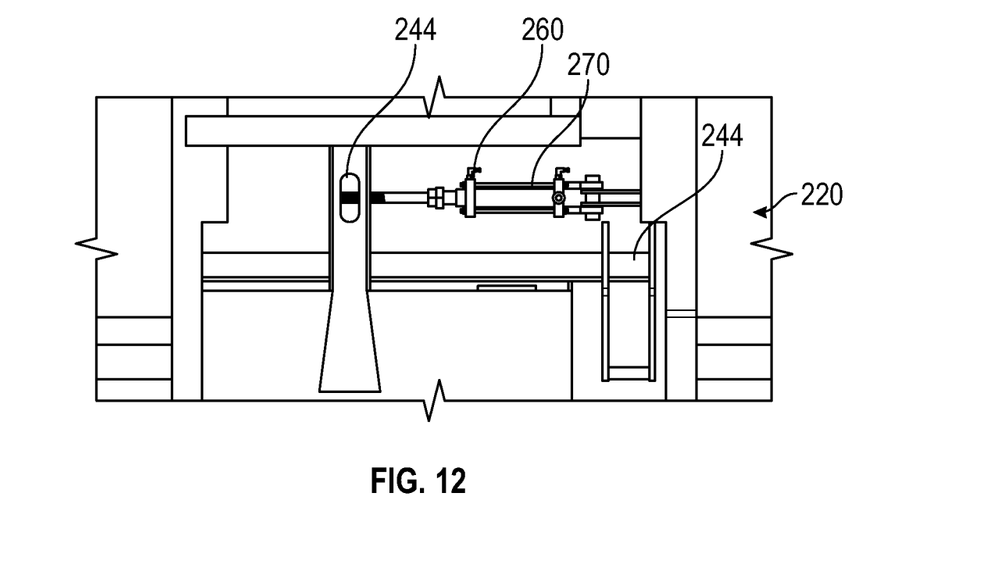
FIG. 12 is a front view of a trailer frame below a deck of the trailer.

Referring to FIG. 11, one or more of the support plates 304 may also be provided with one or more tabs 312 on a face of the support plate such that when the tabs 312 are pushed out from the face of the support plate to extend outwardly therefrom form an aperture in the support plate where additionally an aperture may also be provided in the surface area of the tab itself. Cables, cords, or wiring harnesses may be run along the trailer through the apertures of the support plates for powering lights or other accessories on the trailer or connecting the trailer to a tow vehicle electrical system.

The trailer 30 illustrated in the figures may have a primary deck that is about 12 inches off the ground when the trailer rests on ends of the ramps or is otherwise not connected to the lift and tow module 10. When connected to the lift and tow module 10 and in a raised position for towing, the lift and tow module 10 may support the front end of the trailer at the lift body 140 with the primary deck at a road height of about 20.5 inches.

The trailer 30 may also be a step deck type trailer at a rear end of the trailer 30 wherein the deck rests about the rear wheels of the trailer. The frame may support one or more axles for one or more pair of ties and in the embodiment illustrated, each axle supports four wheels with a 17.5 inch rim where most trailers of the type utilize 16 inch tires. The weight rating of the trailer illustrated in the figures is 10,000 lbs per axle and up to 24,000-25,000 lbs as a weight rating and wherein the trailer 30 can be safely loaded and pulled by a truck such as a pickup truck without undue strain on the axles of the truck.

Although the present disclosure has been described with reference to preferred embodiments, workers skilled in the art will recognize that changes may be made in form and detail without departing from the spirit and scope of the disclosure.

The invention claimed is:

1. A method of lifting and towing a trailer with a tow vehicle comprising:
   providing a lift and tow apparatus with a main body comprising a first arm configured with a first arm end for connecting to a tow vehicle, a lift body configured with a second, lift body end for connecting to a trailer, and a second arm supported by the main body and extendable and retractable with respect to the main body, and wherein the tow vehicle is a pickup truck having a bed and a tailgate;
   securing the first arm end to a corresponding attachment mechanism on the bed of the pickup truck;
   lowering the second, lift body end to couple one or more connection points on a terminal end of the second, lift body end to one or more corresponding connection points on the trailer;
   raising a support plate connected to the second arm from removable connection with the bed of the tow vehicle;
   raising the second, lift body end to lift a connected end of the trailer off a ground surface to a road height for towing; and
   engaging one or more locking mechanisms to secure the lift body at a selected height and to secure the lift body to the trailer for towing.

2. The method of claim 1 and further comprising lowering the second, lift body end and uncoupling the second, lift body end from the trailer and further comprising lowering a support arm on the lift and tow apparatus onto the bed of the tow vehicle to support the lift and tow apparatus off of the ground surface.

3. The method of claim 1 and further comprising lowering the second, lift body end and unsecuring the first arm end from the corresponding attachment mechanism on the bed of the tow vehicle and removing the tow vehicle.

4. The method of claim 1 and moving the lift body in reciprocal directions by way of at least one mechanical actuator operably coupled to the lift body and extending and retracting the second arm with respect to the main body by way of at least one mechanical actuator operably coupled to the adjustable arm.

5. The method of claim 1 wherein securing the first arm end to the corresponding attachment mechanism on the bed of the pickup truck comprises connecting a ball coupler in the first attachment end to a ball mounting in the bed of the pickup truck.

6. The method of claim 1 wherein securing the first arm end to a corresponding attachment mechanism on the bed of the pickup truck comprises providing a coupling tube in the first arm for coupling with a gooseneck hitch projecting upwardly from the bed of the pickup truck.

* * * * *